United States Patent [19]
Browne et al.

[11] Patent Number: 5,549,134
[45] Date of Patent: Aug. 27, 1996

[54] DIAPHRAGM VALVE

[75] Inventors: Ronnie A. Browne, Derry; Marc Baril, Hollis, both of N.H.

[73] Assignee: MarcValve Corporation, Tewksbury, Mass.

[21] Appl. No.: 552,253

[22] Filed: Nov. 2, 1995

Related U.S. Application Data

[63] Continuation of Ser. No. 250,699, May 27, 1994, abandoned.

[51] Int. Cl.⁶ ............................... F16K 11/22; F16K 7/12
[52] U.S. Cl. .................... 137/606; 137/240; 137/241; 137/883; 251/63.5; 251/122; 251/331
[58] Field of Search ..................... 137/241, 606, 137/883, 240, 863; 251/63.5, 122, 129.17, 331

[56] References Cited

U.S. PATENT DOCUMENTS

| | | | |
|---|---|---|---|
| Re. 34,261 | 5/1993 | Sule | 251/129.17 X |
| 2,865,402 | 12/1958 | Miller | 251/331 X |
| 3,073,341 | 1/1963 | Schernekau | 137/240 X |
| 3,080,887 | 3/1963 | Brandenberg | |
| 3,080,888 | 3/1963 | Brinkel | |
| 3,545,722 | 12/1970 | Bovio et al. | 251/331 |
| 3,884,259 | 5/1975 | Hosmer et al. | 137/375 |
| 3,884,260 | 5/1975 | Hilgert | 137/469 |
| 4,180,239 | 12/1979 | Valukis | 251/331 X |
| 4,720,076 | 1/1988 | Hyde | 251/331 X |
| 4,794,951 | 1/1989 | Ryzner | 137/596.15 |
| 4,794,952 | 1/1989 | Burkard | 137/597 |
| 4,836,236 | 6/1989 | Ladisch | 251/331 x |
| 4,860,794 | 8/1989 | Parrot et al. | 137/637.2 |
| 4,979,527 | 12/1990 | Mueller et al. | 137/240 X |
| 5,127,625 | 7/1992 | Kleinhappl | 251/331 X |
| 5,172,728 | 12/1992 | Tsukazaki | 137/637.2 |
| 5,222,523 | 6/1993 | Trimble | 251/331 X |
| 5,288,052 | 2/1994 | Black et al. | 251/331 X |
| 5,333,643 | 8/1994 | Gilchrist et al. | 251/331 X |
| 5,361,802 | 11/1994 | Kroll et al. | 251/129.17 X |

OTHER PUBLICATIONS

Christi, Yusuf and Moo–Young, Murray; "Clean–in–Place Systems for Bioreactors: Design, Validation and Operation" vol. 27, Bioprocess Engineering—1993, ASME 1993.

Jordan, John M.; "Integrating CIP Systems Into Process Design", BED–vol. 27, Bioprocess Engineering—1993, ASME 1993.

Young, Jack H.; "Parameters Governing Steam–in–Place Sterilization", BED–vol.27, Bioprocess Engineering—1993, ASME 1993.

Childers, Robert W.; Kojsza, Susan A.; "Hydrogen Peroxide Vapor Sterilization–in–Place Systems", BED–vol. 27, Bioprocess Engineering—1993, ASME 1993.

Netzel, James P.; "Seal Technology For Bioprocessing Equipment", BED–vol. 27, Bioprocessing Engineering—1993, ASME 1993.

(List continued on next page.)

*Primary Examiner*—Gerald A. Michalsky
*Attorney, Agent, or Firm*—Weingarten, Schurgin, Gagnebin & Hayes

[57] ABSTRACT

A sanitary valve comprising a valve body, a diaphragm and an actuator is provided. The valve body includes a cavity or bowl which defines a fluid chamber. A hole for passage of fluid into or out of the chamber is located in the bottom of the cavity. A second hole is located in the side of the cavity. Passages connect the holes to connection ports on the outside of the valve body. The ports, passages, holes and fluid chamber provide a fluid path through the valve. The diaphragm is mounted over the cavity and includes in its center a boss or raised area which extends into the cavity. The boss controls the flow of fluid through the valve. The size of the boss is slightly larger than the hole in the center of the cavity. The boss has a thickness selected so that the boss closes the center hole when the diaphragm is flexed towards the cavity. The actuator, which is mounted over the backside of the diaphragm, is connected to the center of the diaphragm and flexes the diaphragm as necessary to open and close the center hole to control the fluid flow through the valve.

34 Claims, 13 Drawing Sheets

OTHER PUBLICATIONS

Linflow VP40D Series Advertisement; "Control Valves, Direct Pneumatic Actuation", Linflow Technologies Division of Hypernetics Limited, Box 236, Arnprior, Ontario, Canada (undated).

Whiteman, T. E.; "Flexible Diaphragm Actuates Laminar Flow Valve", Article reprinted from Design News, Feb. 23, 1987, Cahners Pulishing Co.

Carvell, J. P.; "Sterility and Containment Considerations in Valve Selection", Pharmaceutical Engineering, Jan/Feb, 1992: vol. 12, No. 1, pp. 31–35.

Liquid Chromatography Systems, K–Prime™ 400–AS, Publication no 1111, Amicon, Inc. Beverly, MA. (undated).

Liquid Chromatography Systems, K–Prime™ 40–AS, published by Amico, Inc., Beverly, MA. (undated).

µ–ZERO™ 3–Way Valves, published by Triflow Controls Corporation, Tokyo, Japan. (undated).

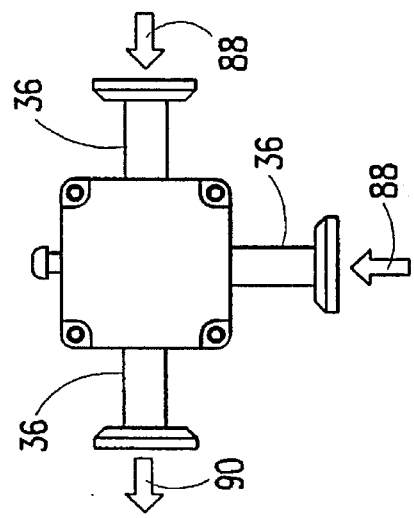
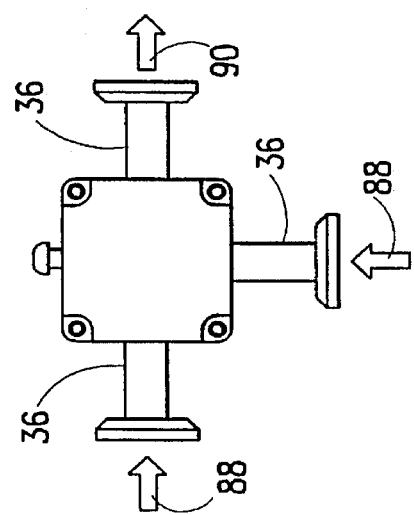
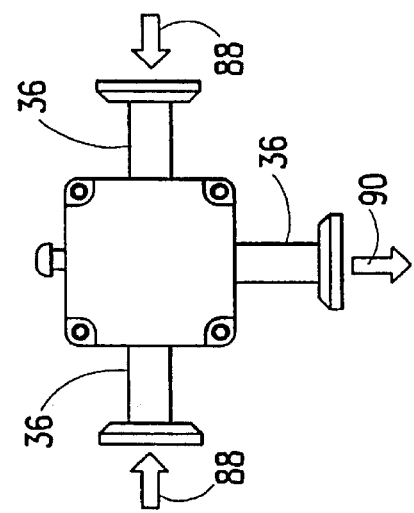

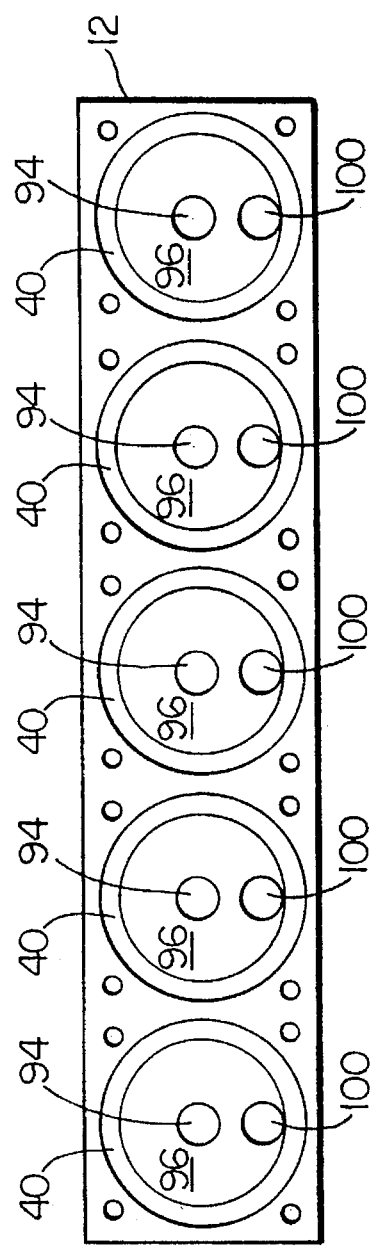
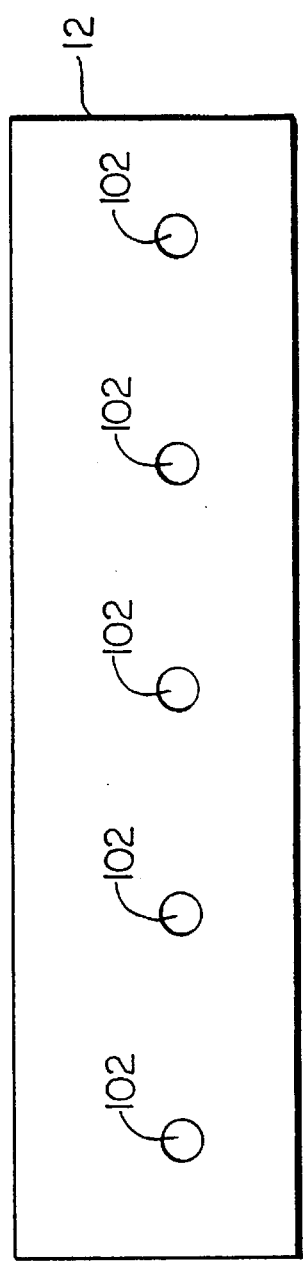
FIG. 11A
FIG. 11B

DIAPHRAGM VALVE

This application is a continuation of application Ser. No. 08/250,699, filed May 27, 1994, now abandoned.

FIELD OF THE INVENTION

This invention relates to fluid valves and more particularly to diaphragm fluid valves for sanitary applications.

BACKGROUND OF THE INVENTION

Valves which are used in the food processing, biotech, pharmaceutical, and medical fields to control, mix, divert or meter fluids for industrial and research applications must be designed to operate in a sanitary manner and prevent contamination of the fluid product passing through the valve. A fluid valve used in the food processing, biotech, pharmaceutical and medical fields must therefore be inert to the system in which the valve is a part. The valve itself must not contaminate the fluid product, nor allow contamination of the fluid from sources either inside or outside of the system. Sources inside of the system can include the material of the valve itself or accumulated residue from cleaning or other fluids, including stale or contaminated fluid entrapped in spaces in the valve. In the case of mixing and diverting systems, such inside sources can also include other system fluids controlled by the valve. Because of leakage, slow or imprecise actuation or the presence of dead spaces which allow fluids to accumulate, cross contamination of the fluids in the system may occur.

Contamination from inside sources is a particular concern if the system must handle successive batches of fluids such as blood, where one or more batches may contain a deadly contaminant, such as the HIV virus. Entrapped residue of an earlier contaminated batch can contaminate later batches, with deadly consequences. Also, if the valve must handle fluids containing dangerous or deadly substances, like blood containing the HIV virus, it is important that the valve handle the fluid without contamination of the atmosphere, the area around the valve, or other parts of the system.

Contamination sources outside of the system can include germs, viruses or other tiny microorganism or contaminants in the atmosphere, or fluids or other substances used to actuate the valve. These contaminants may work their way into the fluid in the system through spaces or joints in the body of the valve.

In certain applications, such as when biofluids like blood or sensitive fluids containing proteins or enzymes are processed, it is also important that the valves do not stress the fluids with shear or other forces which would damage or otherwise detrimentally affect the integrity of the fluids as they pass through the valve.

As briefly mentioned above, another important consideration for food processing, biotech, pharmaceutical and medical applications is the accuracy and speed of the valve. Accurate and precise actuation prevents leakage across the valve seat which could cause cross contamination. Fast actuation also prevents cross contamination from unwanted mixing of system fluids. In addition to preventing unwanted mixing or contamination, accuracy and speed in valve actuation are important in maintaining accurate control of the fluids, especially if the valve is used for sanitary fill applications, or in combination with other valves in a manifold.

In many applications, it is also useful if the valve has precise metering capability to further provide accurate control of the fluid flow.

Reliability and long life are other important considerations. The valve should be able to cycle as many as one million times without failure or compromise of the sanitary condition of the system.

Because of the complexity of most fluid handling systems, particularly in the food processing, biotech, pharmaceutical and medical fields, it is also important that the valve be small, simple, easy to service and maintain, easy to clean, and easy to replace. Simplicity and reliability in a valve can significantly reduce the initial and life cost of a fluid handling system.

Further, many sanitary applications require that the valve have clean-in-place (CIP) and/or steam-in-place (SIP) capabilities.

SUMMARY OF THE INVENTION

The present invention includes a sanitary fluid diaphragm valve which is particularly suitable for industry and research applications in the food processing, biotech, pharmaceutical and/or medical fields.

The valve of the present invention comprises a valve body, at least one diaphragm and at least one actuator. In a two-way configuration of the valve, the valve body includes a face having a cavity which defines a fluid chamber. In the preferred embodiment, the cavity is in the shape of a smooth bowl. The bowl shape imparts self-cleaning swirling or vortex action on the fluid which cleans the valve as the fluid passes through the cavity and aids the mixing of fluids in the chamber.

A hole is located in the base or center of the cavity for passage of fluid into or out of the chamber. A second hole is located in the side of the cavity and also allows passage of fluid into or out of the chamber. Fluid passages through the valve body individually connect the holes in the cavity to separate ports on the outside of the valve body. The ports on the outside of the valve body provide connection of the valve to other fluid handling hardware in the system, such as tubing or manifolds. The ports, passages, holes and cavity define a fluid path through the valve. The direction of fluid flow through the valve is not critical, and can occur in either direction.

The diaphragm is securely sealed over the cavity onto a seat provided around the circumferential edge of the cavity. In the preferred embodiment, the seat includes a wall which holds the diaphragm in compression to prevent outward cold flowing of the diaphragm with use over time. The diaphragm includes in its center, on one side, a boss or raised area which extends into the cavity. The size of the boss is slightly larger than the center hole of the cavity. The boss has a thickness which is selected so that the boss closes the center hole when the diaphragm is flexed towards the cavity. For metering requirements, the boss can further include a tapered portion which would extend into the center hole and meter the fluid flow through the valve when the center hole is open.

A flexible web portion spans the diaphragm from the boss to the circumferential edge of the diaphragm. This web portion provides the flexure of the diaphragm necessary for movement of the boss towards and away from the center hole of the cavity. In the preferred embodiment, a radius is provided at the transition from the boss to the web to reduce stress at the transition area and to eliminate an edge which could entrap contaminants or residue. In the preferred embodiment, a radius is also provided at the transition from the circumferential edge of the diaphragm to the web to eliminate another edge which could entrap contaminants or residue.

The actuator is mounted over the backside of the diaphragm and is connected to an actuator fitting on the center of the backside of the diaphragm. The actuator flexes the diaphragm as desired to open or close the center hole of the cavity to control the flow of fluid through the valve. The actuator can be controlled by many different methods; however, pneumatic or manual actuators are most suitable for applications in the food processing, biotech, pharmaceutical and medical fields.

Other configurations of the valve, such as two-way T configurations, and three-way mixing and diverting configurations are possible according to the present invention. In preferred embodiments, the three-way valves of the present invention include two cavities on opposite faces of the valve body, each with holes, passages, a diaphragm and an actuator as described above. A common fluid passage connects the center holes of the two cavities to a common fluid port on the outside of the valve body. Depending on the direction of fluid flow through the valve, the three-way valve can be used as a mixing or a diverting valve.

Three-way mixing and diverting valves fabricated according to the present invention save significant space in a fluid handling systems because such configurations perform the function previously performed by a two or three two-way valves joined by many feet of manifold tubing and many unions. The footprint of the three-way valve of the present invention is significantly smaller than the footprint of the two-way valves joined by the manifold tubing, and the three-way valve of the present invention dramatically reduces contamination. The extra tubing and unions of the joined two-way valves create space and pockets which can become contaminated and damage the fluid product. Further, when the complex, two-way valve assemblies are actuated, it can take several seconds for the fluid flow to shift, creating cross contamination. The fluid flow shift of a three-way valve of the present invention is instantaneous, which eliminates cross contamination.

Further, multiple valve units fabricated according to the present invention can be combined in a single valve body in a compact manifold configuration which eliminates the need for manifold tubing to connect large numbers of valve units together. This configuration further provides a significant saving of space and cost.

Clean-in-place (CIP) and/or steam-in-place (SIP) capability can also be incorporated into the various configurations of the valve of the present invention. For such configurations, the cavity must be deep enough to accommodate a large enough fluid and/or steam flow in the cavity to sufficiently clean and/or sterilize the valve.

BRIEF DESCRIPTION OF THE DRAWINGS

The present invention will be more fully understood by reference to the following detailed description considered in conjunction with the accompanying drawings, in which:

FIGS. 9A–9C are diagrammatic representations of three mixing configurations of three-way valves of the present invention;

FIGS. 11A–11C are top, side and cross-section views, respectively, of a three-way, 5 unit, manifold valve body of the present invention.

DETAILED DESCRIPTION OF THE INVENTION

Figure 1:
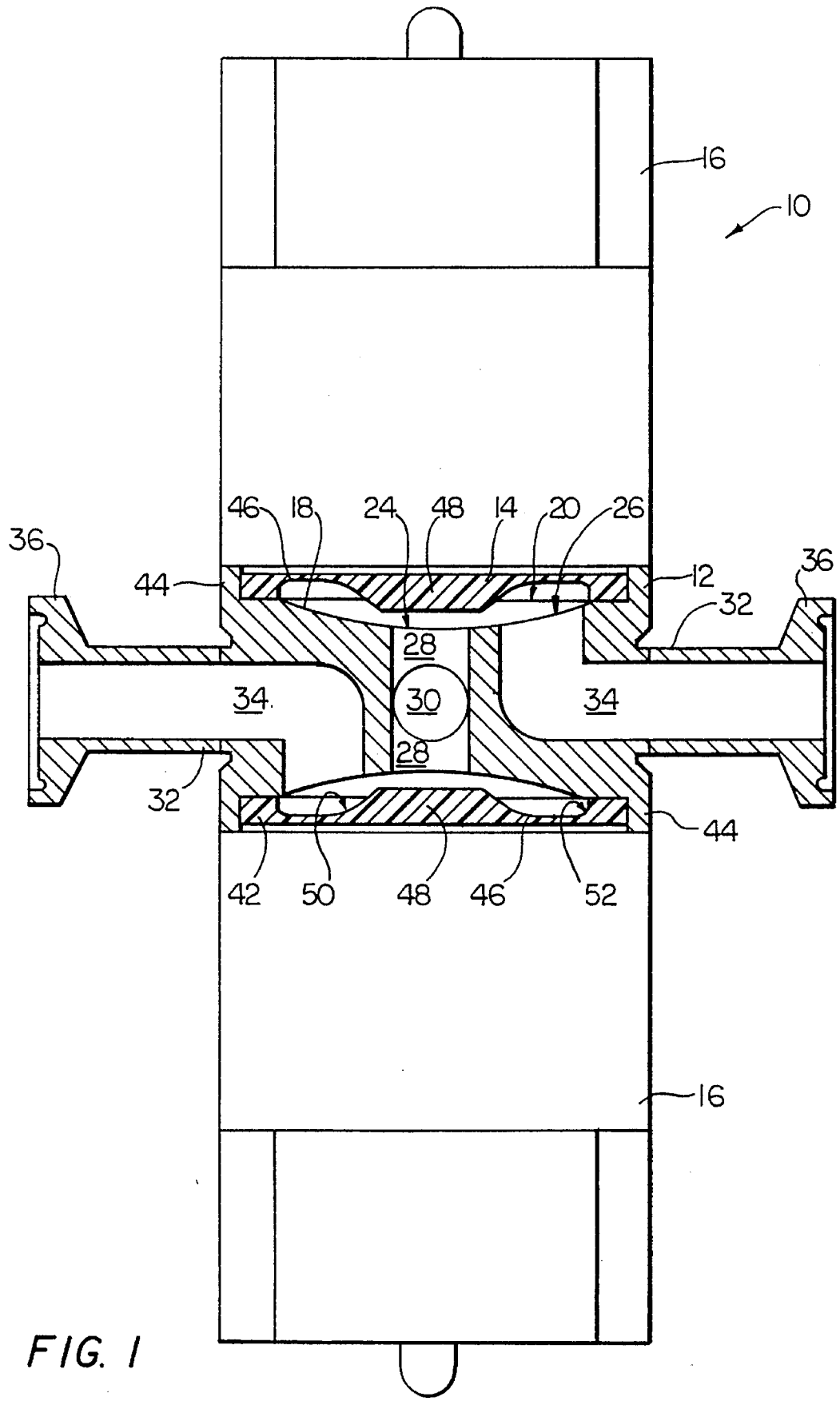
FIG. 1 is a side view of a three-way valve of the present invention with a cut-away of the valve body and diaphragm portions of the valve.

Referring to the drawings wherein like reference numerals designate corresponding or similar elements throughout the several views, a diaphragm valve 10 according to the present invention is shown. The valve 10 of FIGS. 1, 2, 4 and 5 is a three-way valve. Other configurations are possible and the three-way valve is discussed for exemplary purposes only.

The valve 10 comprises a valve body 12, a pair of diaphragms 14 and a pair of actuators 16. Because the embodiment shown is a three-way valve, the valve body 12 includes a pair of bowls 18 each defining a fluid cavity 20. In the valve embodiments shown in FIGS. 1, 2, 4 and 5, the bowls 18 are located in the preferred manner in opposite faces 22 of the valve body 12. As each of the opposite sides of the valve 10 are identical, for the sake of simplicity, only the features of one side of the valve will be discussed below.

In the preferred embodiment, a bowl 18 has a continuous, uninterrupted smooth interior surface, and is shaped or curved to impart a desired swirling or vortex action on the fluid in the valve. This swirling action sweeps bowl 18 to continually clean the fluid cavity as fluid passes through the valve. The swirling action also aids the mixing of fluids in the valve.

Bowl 18 includes a hole 24 at the base or center of the bowl and a hole 26 approximately midway up the side of the bowl. The exact placement of hole 26 in side of bowl 18 is not critical. The holes 24 and 26 allow passage of fluid into and out of the fluid cavity 20 defined by bowl 18.

A common fluid passage 28 connects the center holes 24 of both bowls of the three way valve. A further fluid passage 30 connects common fluid passage 28 to a port on the outside of the backside of valve body 12. The port provides one of the connections of the valve to other components in the fluid handling system, such as a fluid source and/or destination. The port and passages 28 and 30 define a common fluid path through center holes 24 to the pair of bowls 18.

Figure 2:
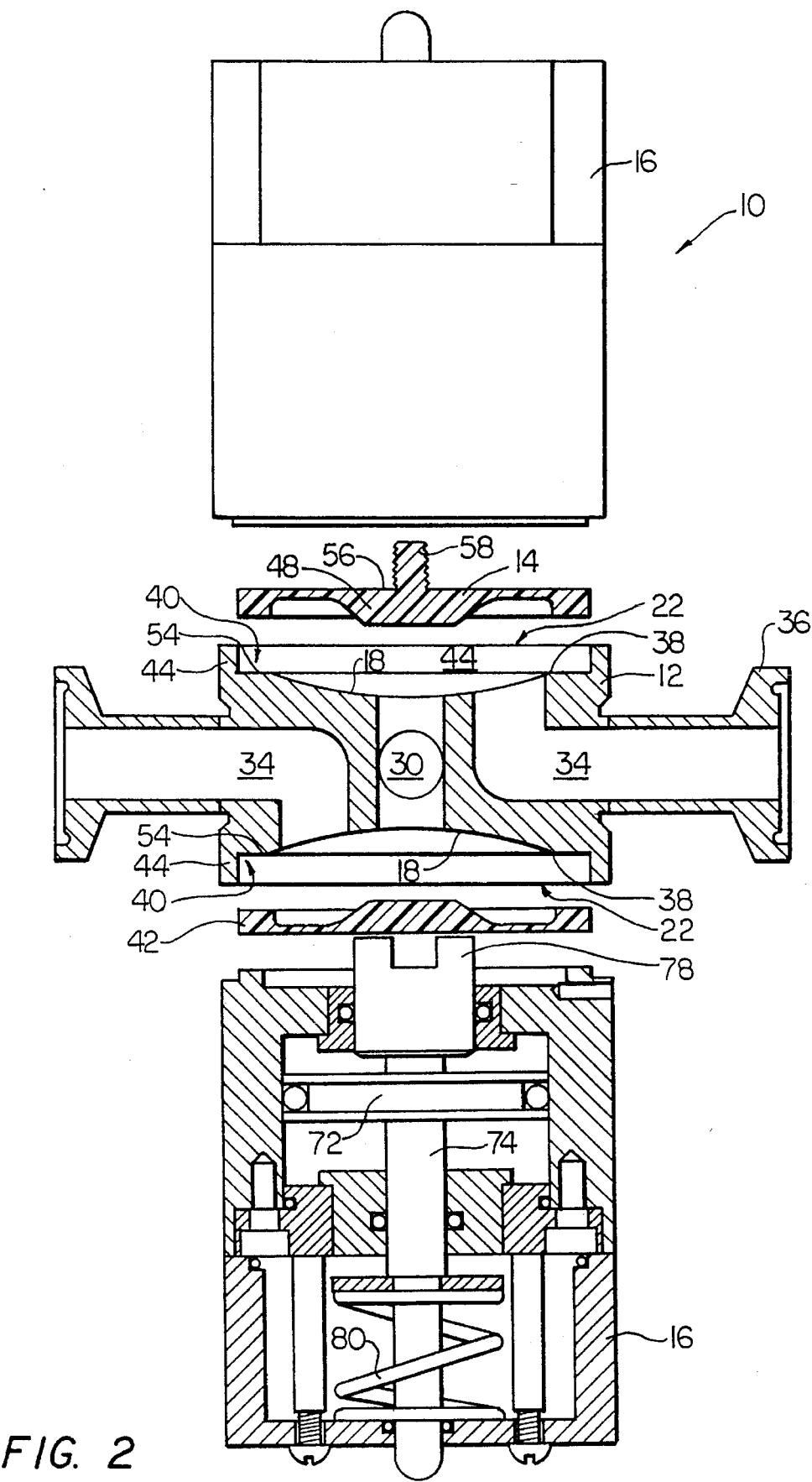
FIG. 2 is an exploded view of the valve of FIG. 1 with a further cut-away of portions of one actuator.

For each of the bowls 18, valve body 12 further includes a port 32 and a fluid passage 34 which define a fluid path to the bowl 18 through hole 26 in the side of the bowl. In the embodiment of FIGS. 1 and 2, valve body 12 also includes fluid fitting 36 which facilitates connection of the port to other components of the fluid system, such as a fluid source or destination.

In face 22 of valve body 12, and around the circumferential edge 38 of bowl 18, the valve body 12 includes a diaphragm seat 40. The diaphragm seat 40 is shaped to accommodate the outside circumferential edge 42 of diaphragm 14 to seal the diaphragm edge 42 to seat 40. The diaphragm seat 40 includes a wall 44 which further seals the edge 42 of the diaphragm and holds the diaphragm in compression.

In the preferred embodiment, valve body 12 is precision machined from a solid block of 316L stainless steel bar stock. Such construction provides a better fit and finish than the cast or forged bodies of other valves used in the food processing, biotech, pharmaceutical or medical fields.

Further referring to the figures, diaphragm 14 includes a circumferential outside edge 42, a web 46 and a boss 48. Web 46 spans from outside circumferential edge 42 to boss 48 and provides the flex in the diaphragm.

In the preferred embodiment, diaphragm 14 is precision machined from a solid block of virgin polytetrafluoroethylene (PTFE), such as TEFLON brand. Machined, virgin PTFE, such as TEFLON brand is superior as material for a valve diaphragm when compared to molded PTFE or EPDM rubber used in other valves. With use, molded and non-virgin PTFE cracks and flakes, and does not have the durability and long life of virgin PTFE, such as TEFLON brand for diaphragms. EPDM rubber cause contamination because the rubber, with use over time, begins to shed particles which mix with the fluid product passing through the valve.

Boss 48, a substantially raised or thicker portion of the diaphragm, is located on one side of the diaphragm and extends into the bowl 18 of valve body 12. The boss 48, which in the shown embodiment is circular, has a diameter which is slightly larger than the size of center hole 24 of bowl 18 of valve body 12. If the diameter of the boss is too small, with use of the valve over time, the boss will begin to extrude through hole 24, causing flaking or shredding of the diaphragm at the extrusion zone because of shearing of the PTFE material. Such flaking or shredding will cause contamination of the fluid product. Conversely, if the diameter of boss 48 is too wide, the diaphragm will loose flexure because the area of web 46, which provides the flexure, will be reduced. Such loss of flexure decreases the resiliency of the diaphragms shortens diaphragm life. The loss of flexure results in overstressing of web 46, resulting in cracks in the web, deformation of the web, or other failures. Thus, in the preferred embodiment, the diameter of the boss should be between approximately 1.25 to 1.35 times greater than the diameter of center hole 24 of bowl 18.

The thickness or height of boss 48 is dependent upon the depth of bowl 18. Boss 48 is dimensioned to have a depth or thickness so that when in use, the boss closes center hole 24 of bowl 18 when the diaphragm is flexed towards the bowl. In the preferred embodiment, the bowl diameter is at least approximately 3.5 to 4 times the diameter of boss 48 on diaphragm 14, and the depth of bowl 18 is at least one-eighth of the bowl diameter.

Boss 48 includes a smooth radius 50 at the transition from boss 48 to web 46. The smooth radius 50 avoids an edge between boss 48 and web 46 which could collect contamination or residue. The radius 50 also reduces stress in the diaphragm at the radius area. If the radius is too small, stresses concentrated at the radius area could lead to premature failure of the diaphragm. Also, too small a radius could cause contaminants and/or residue to collect at the radius area.

Conversely, if radius 50 is too large, the area of web 46 will be reduced, causing loss of flexure which reduces diaphragm life and causes failure, as discussed above. Thus, in the preferred embodiment, a radius equal to approximately one-half of the boss diameter is used to transition from the boss 48 to the web 46. This dimension minimizes the flexure stress on the web and eliminates entrapment of contaminants and/or residue at the transition zone.

To ensure adequate sealing of the diaphragm 14 to the valve body 12, in the preferred embodiment, the outside circumferential edge 42 of diaphragm 14 should be at least about two times the thickness of web 46. In the preferred embodiment, a radius 52 is provided inside edge 42 to smoothly transition from web 46 to circumferential edge 42. Like radius 50 discussed above, radius 52 also prevents entrapment of contaminants and/or residue at the transition zone. Typically, in the preferred embodiment, radius 52 is approximately 0.32 inches for a two-inch diaphragm and approximately 0.60 inches for a three-inch or greater diaphragm.

Diaphragm 14 is press-fit over the bowl 18 into diaphragm seat 40 of valve body 12. Wall 44 of diaphragm seat 40 holds the diaphragm in radial compression, preventing outward cold-flow of the diaphragm with use over time. Thinning of the diaphragm caused by such cold-flow can lead to premature failure of the diaphragm and contamination of the fluid product caused by cracking and flaking of the diaphragm.

Further, wall 44 eliminates a potential direct contamination path between the outside of valve body 12 and fluid cavity 20 in bowl 18. Because the wall prevents cold-flowing of the diaphragm and blocks the path between diaphragm edge 14 and base 54 of diaphragm seat 40, contaminants cannot work their way into or out of fluid cavity 20 between edge 14 and base 54. This feature is advantageous for preventing contamination by tiny microorganisms, such as germs, viruses and bacteria.

Backside 56 of diaphragm 14 includes an actuation fitting 58 which connects the center of the backside of the diaphragm to actuator 16. Actuator 16 provides the required force to flex the diaphragm to operate the valve. In the disclosed embodiments, actuation fitting 58 is a threaded male connector integrally formed on the backside of diaphragm 14.

Figure 5:
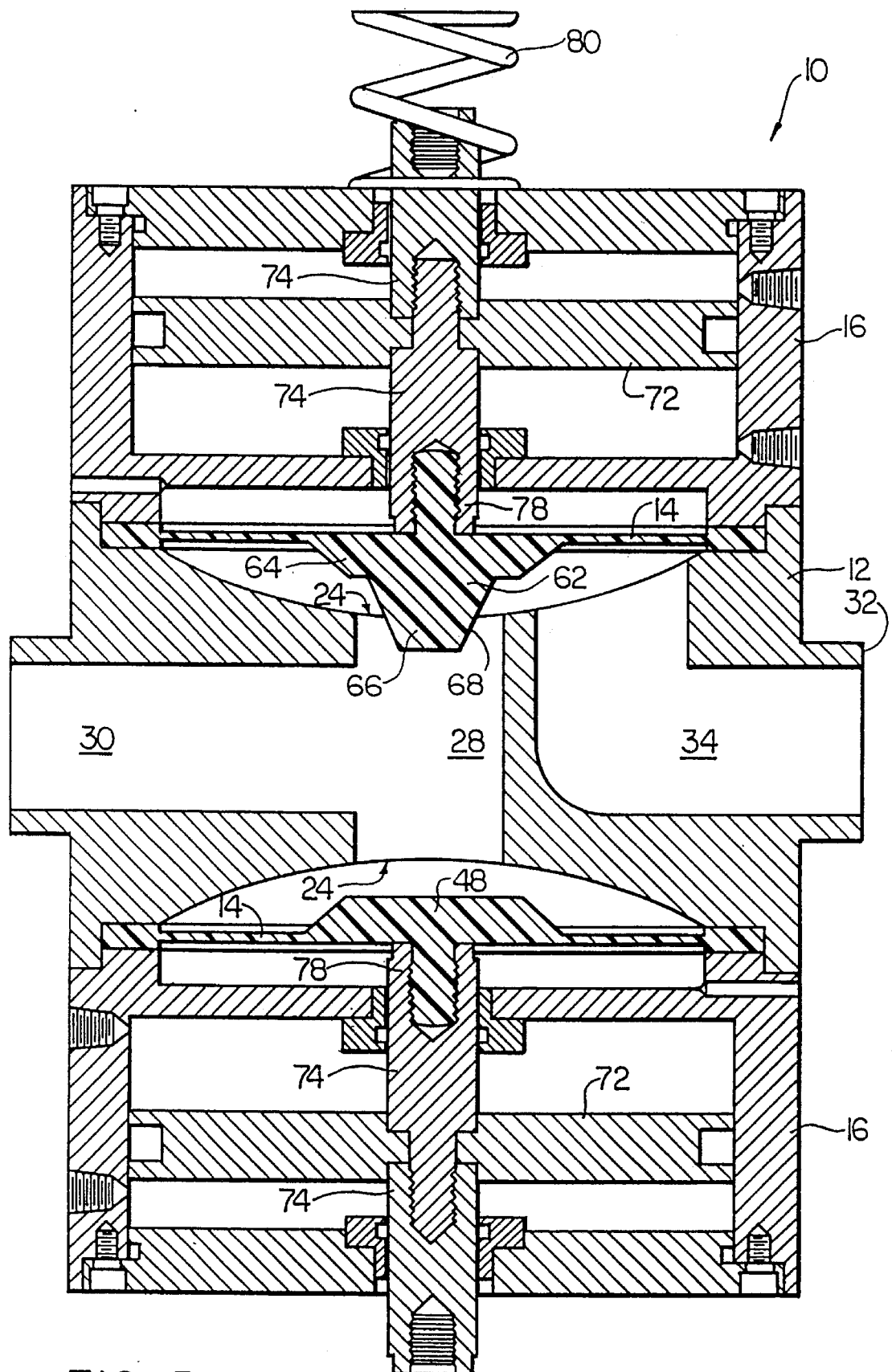
FIG. 5 is a cross-section view of a further embodiment of a three-way valve of the present invention.
Figure 6:
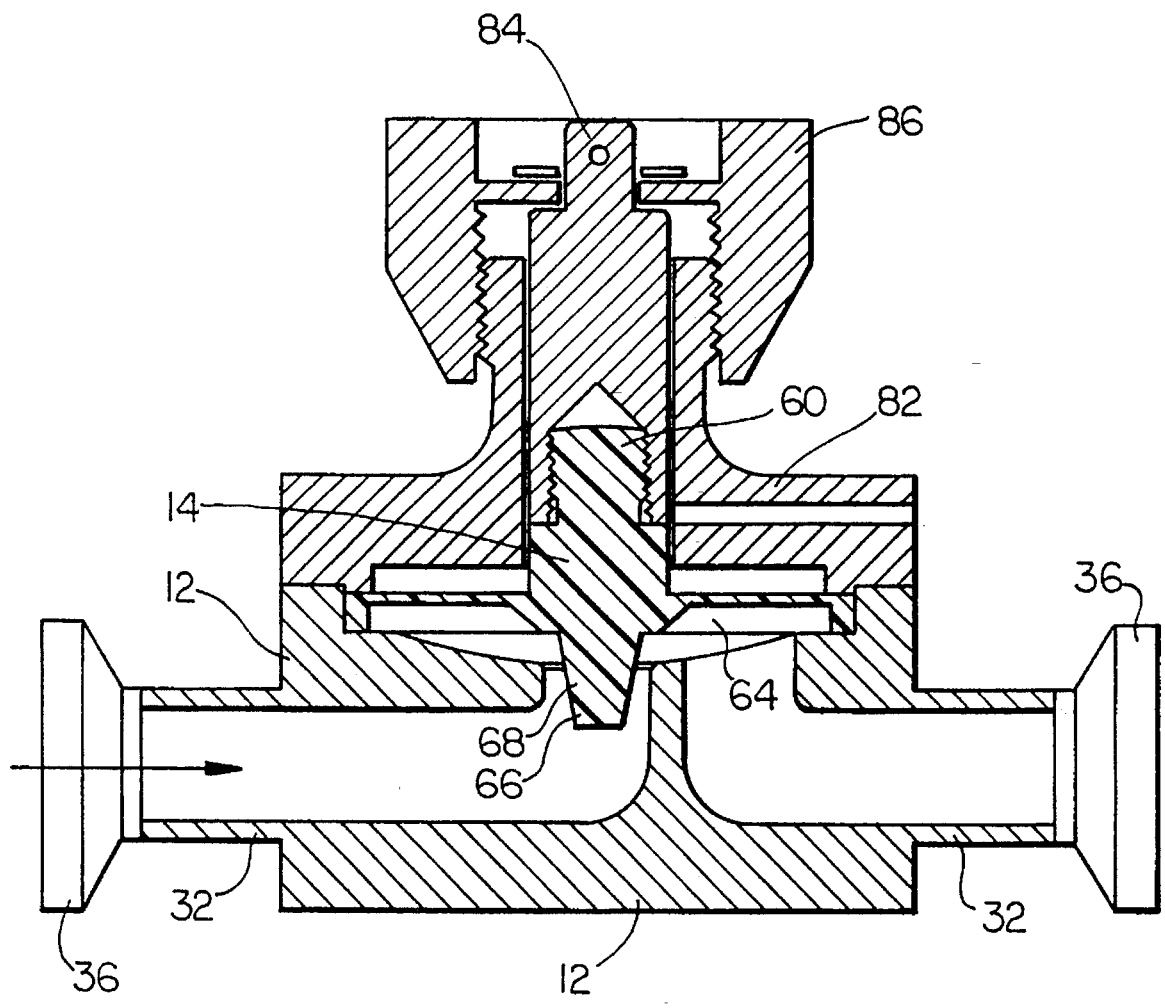
FIG. 6 is a partial cross-section view of a manually actuated two-way metered valve of the present invention.

As shown in the alternative embodiments of FIGS. 5 and 6, the boss of the diaphragm can be configured to provide metered flow through center hole 24 of bowl 18. For example, metering boss 62 comprises a base portion 64 and a metering portion 66. Base portion 64 is the portion of metering boss 62 which opens or closes center hole 24. The metering portion 66, which extends into the center hole 24, is the portion of metering boss 62 which meters the flow of fluid through hole 24 once the valve is opened.

The base portion 64 is dimensioned similarly to boss 48 of the non-metering diaphragm discussed above. Thus, the thickness and diameter of base portion 64 correspond to the thickness and diameter of boss 48 of the non-metered diaphragm.

The shape of the metering portion 66 is selected for a desired metering profile. In the embodiments shown in FIGS. 5 and 6, the metering portion 66 is conical in shape and includes tapered sides 58. Thus, when the valve is open, the metering boss 62 of the embodiments of FIGS. 5 and 6 provides a relatively linear metering profile.

The advantage of the metering feature of the present invention over other diaphragm valves having metering functions is two-fold. The metering boss 62 of the present invention can completely shutoff the fluid flow, if desired. Other metering diaphragm valves can meter fluid-flow, but cannot shut off all fluid flow. If complete cessation of fluid flow is required, the other metering diaphragm valves must be joined with a separate shut-off valve.

Further, because of the very short fluid path between the sides of metering portion 66 and hole 24, the metering diaphragm of the present invention does not subject the metered fluid product to shear stresses. Such a consideration is especially important when the metered fluid is a sensitive biofluid, such as blood or fluids containing proteins or enzymes, especially proteins injected with hormones. Other metering diaphragm valves have long metering paths which tend to shear sensitive fluids.

Figure 3:
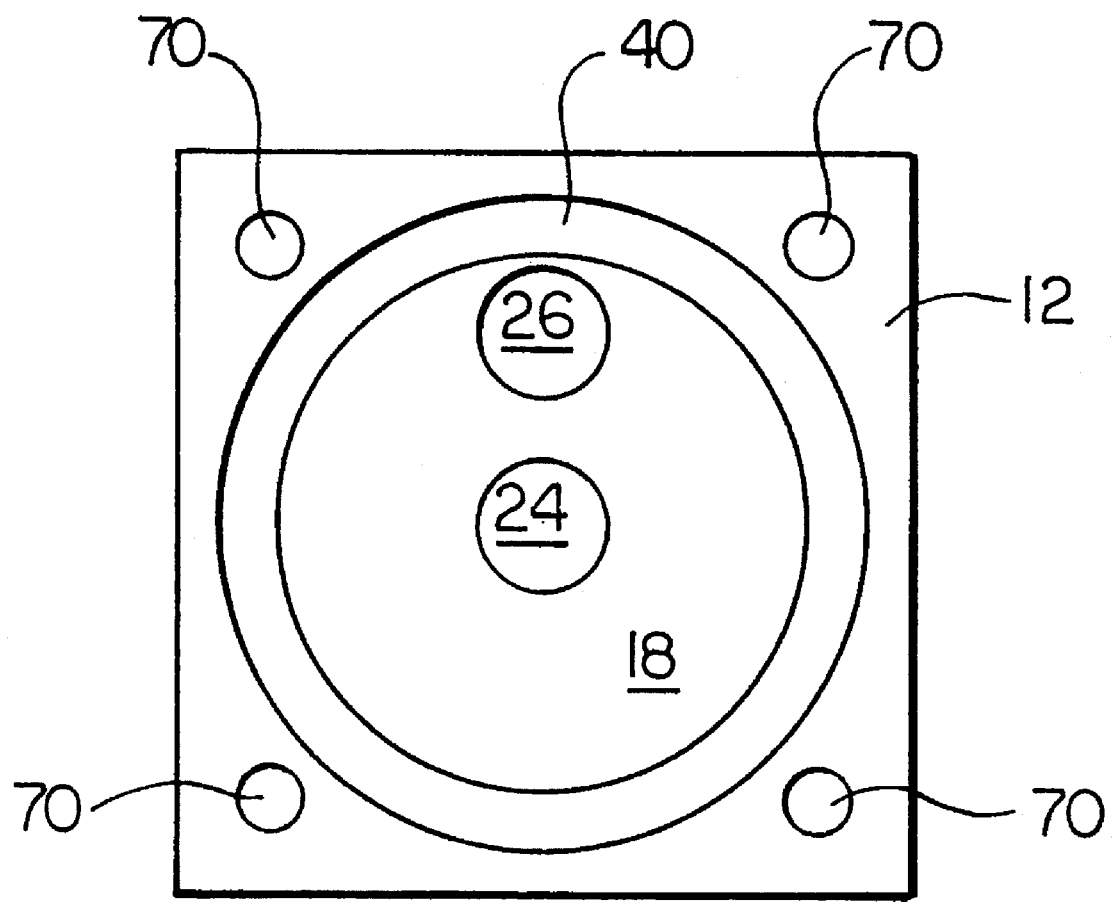
FIG. 3 is a top view of a portion of the valve body of the valve of FIGS. 1 and 2.
Figure 4:
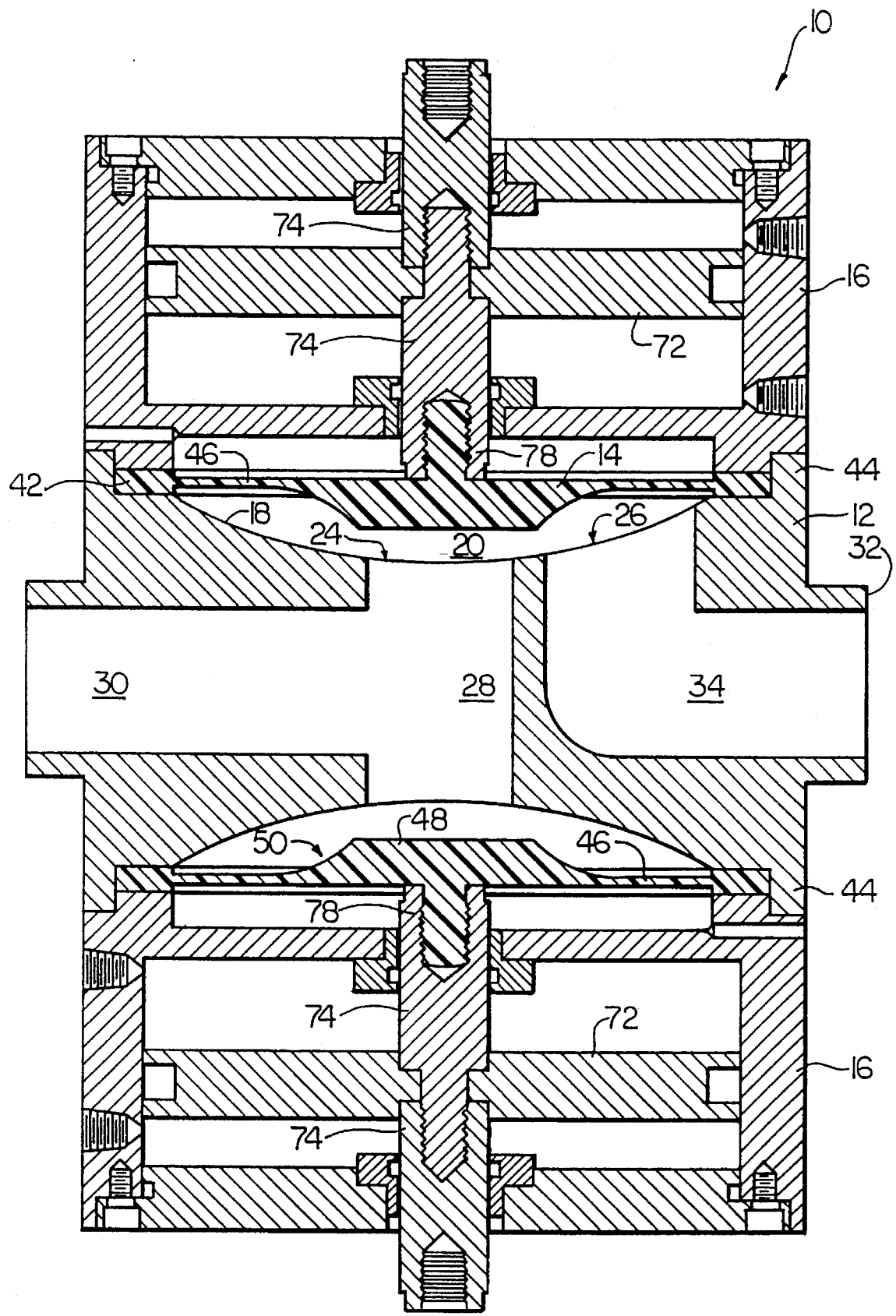
FIG. 4 is a cross-section view of an alternative embodiment of a three-way valve of the present invention.

In the embodiment shown, actuator 16 supplies the force to flex diaphragm 14 to operate the valve. The embodiments shown in most of the drawings include pneumatically-operated actuators. FIGS. 4 and 5 show a configuration of a pneumatically-operated actuator slightly different from the actuator of FIGS. 1 and 2. Actuator 16 is mounted over the backside of diaphragm 14 to firmly secure diaphragm 14 in diaphragm seat 40 of valve body 12. In the embodiments shown, bolts (not shown) firmly fasten actuator 16 to base 22 of valve body 12. Bolt holes 70 in the face of valve body 12 can be seen in FIG. 3.

The pneumatic actuator 16 includes a piston 72 mounted on a sliding shaft 74. The end of the shaft 76 at the mounting end 78 of the actuator 16 includes a threaded hole which mates with the threaded male connector 60 of the diaphragm 14. Air introduced into actuator 16 on one side of piston 72 causes the piston to move, which flexes diaphragm 14. Actuator 16 can include biasing devices, such as springs 80 shown in FIGS. 2 and 5, to bias the actuator and the diaphragm to a particular position.

Other actuators, such as electromechanical, hydraulic or manual actuators can also be used. For example, FIG. 6 shows a two-way metered diaphragm valve of the present invention having a manual actuator 82. The manual actuator 82 includes an actuator shaft 84 which is threaded at the face end to receive the threaded male connector 60 of diaphragm 14. A threaded knob 86 fastened to the opposite end of actuator shaft 84 controls the movement of the actuator shaft. As knob 86 is turned, actuator shaft 84 moves to flex diaphragm 14 a desired amount.

Figure 7C:
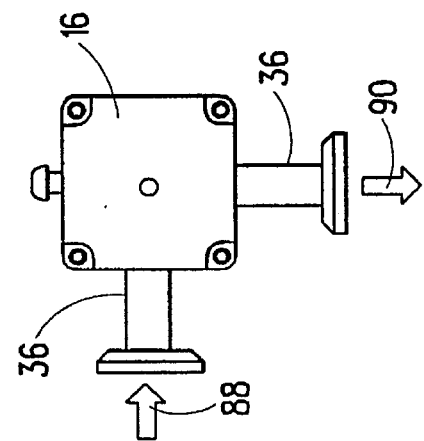
FIGS. 7A–7C are diagrammatic views of three configurations of two-way valves of the present invention.
Figure 7B:
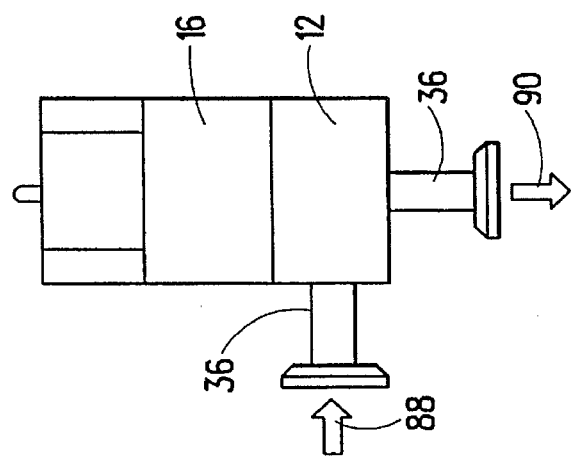
Figure 7A:
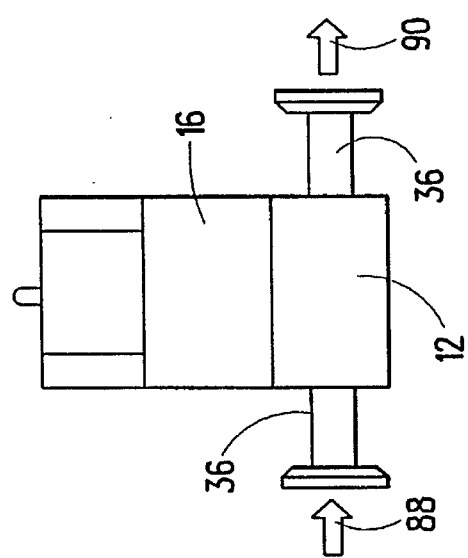
Figure 8C:
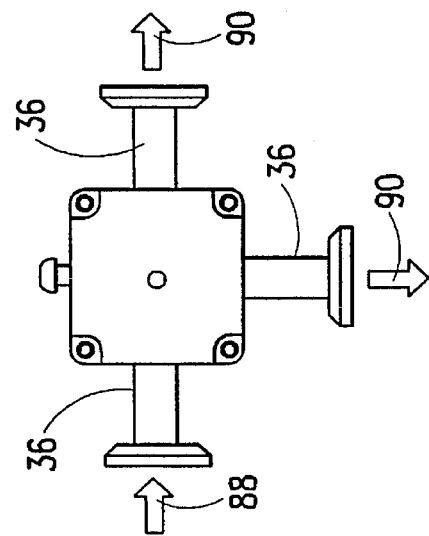
FIGS. 8A–8C are diagrammatic representations of three configurations of two-way T valves of the present invention.
Figure 8B:
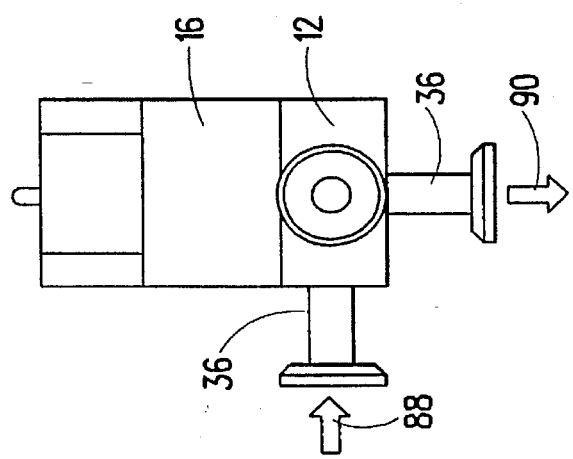
Figure 8A:
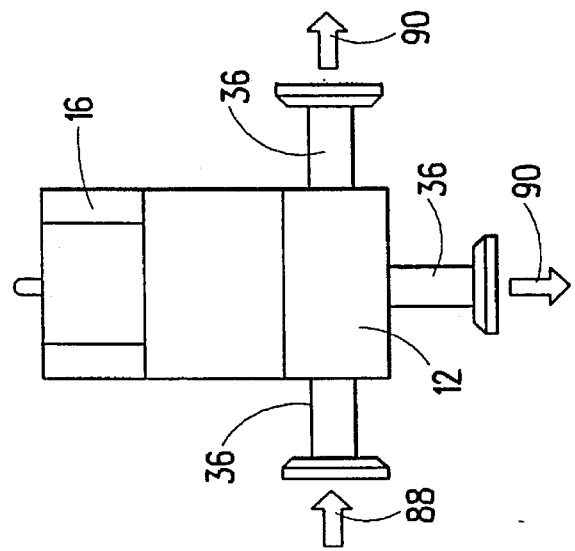

The diaphragm valve of the present invention can be fabricated in a variety of configurations. For example, FIGS. 7A–7C and 8A–8C show two-way valve embodiments of the present invention in a variety of configurations. FIGS. 7A–7C show standard two-way valve configurations. Arrows 88 depict fluid flow into the valve configuration; and arrows 90 depict fluid flow out of the valve configurations. FIG. 7A shows a straight flow configuration, FIG. 7B shows a 90° vertical configuration, and FIG. 7C shows a 90° horizontal two-way configuration. FIG. 8A shows a vertical two-way T configuration, FIG. 8B shows a corner two-way T configuration, and FIG. 8C shows a horizontal two-way T configuration.

Figure 10C:
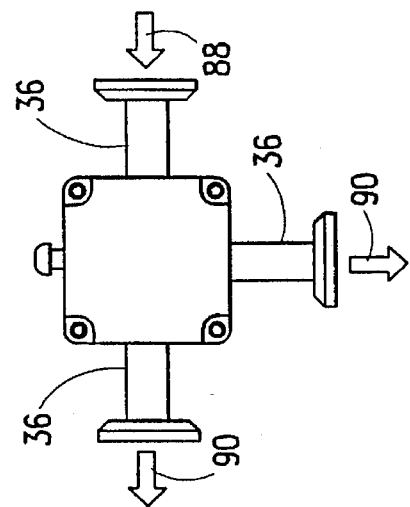
FIGS. 10A–10C are diagrammatic representations of three diverting configurations of three-way valves of the present invention.
Figure 10B:
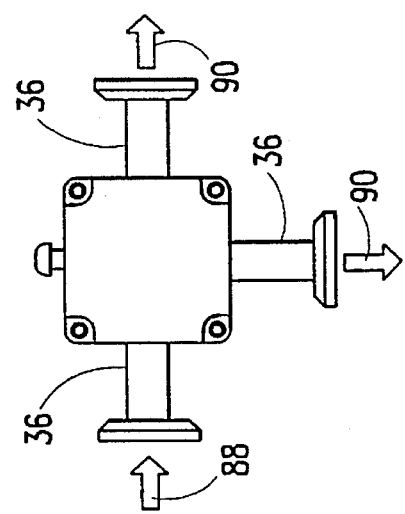
Figure 10A:
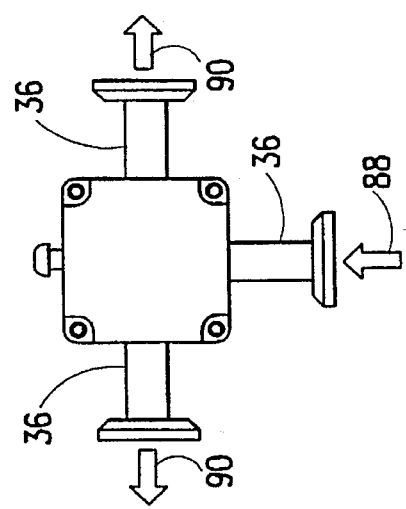

FIGS. 9A–9C and 10A–10C show diaphragm valves of the present invention in three-way configurations. Arrows 88 show fluid flow into the valves, and arrows 90 show fluid flow out of the valves. FIGS. 9A–9C show various three-way mixing configurations. FIGS. 10A–10C show the various three-way diverting configurations. In FIGS. 10A–10C, fluid product flows out of the valves in only one of the output fluid flow paths depicted by arrows 90 for the particular configuration. By operation of the valve, the user selects the output path for the fluid to take.

Figure 11C:
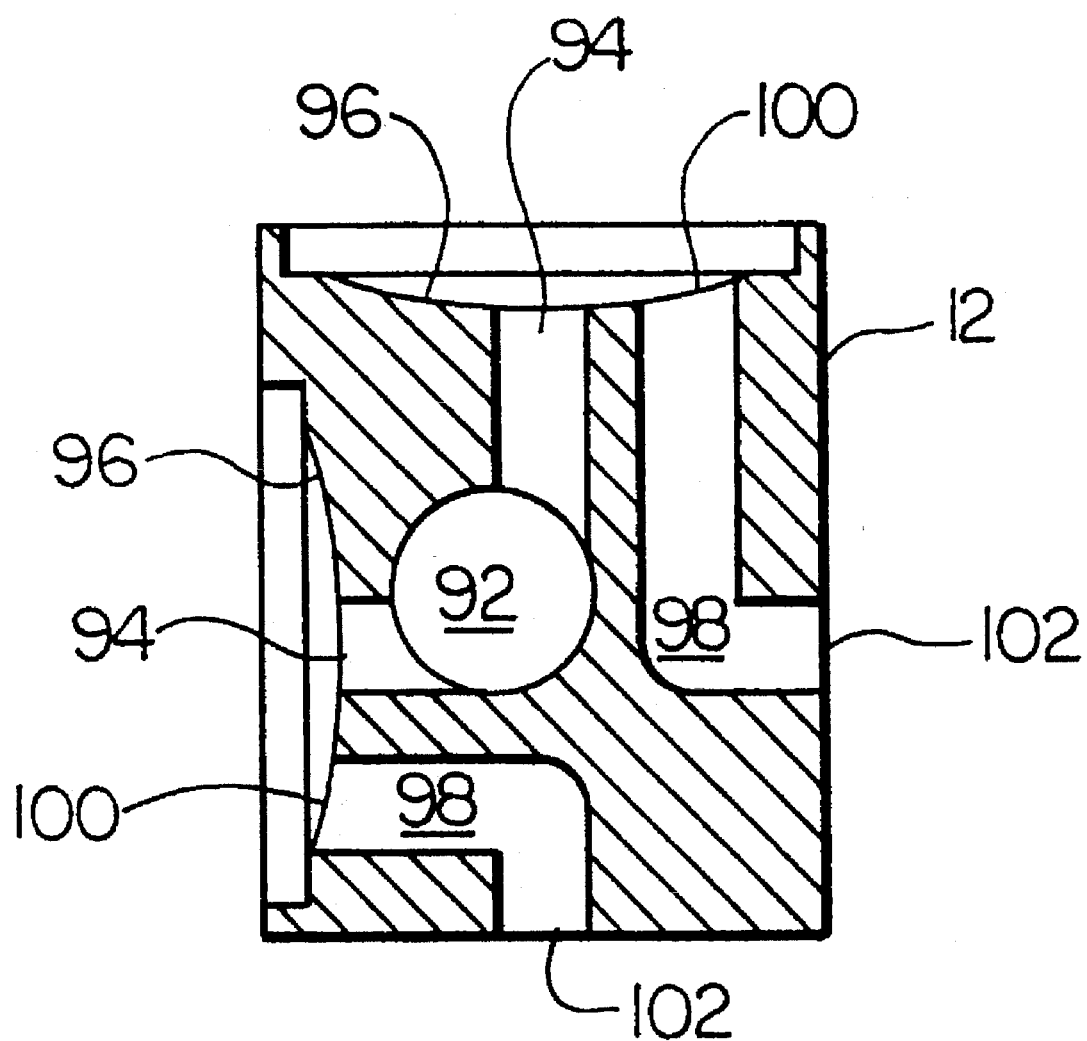

FIGS. 11A–11C show the valve body of a three-way, five unit manifold valve body of the present invention. As can best be seen in FIG. 11C, a common fluid passage 92 axially extends the length of the manifold to provide a common fluid passage to the center holes 94 of the bowls 96 of the valve body 12. A side port (not shown) permits connection of the common fluid passage to other components of the fluid system, such as a fluid source or destination. Fluid passages 98 individually and separately connect the side holes 100 of the bowls 96 to ports 102 for connection to other components in the fluid system.

Figure 12A:
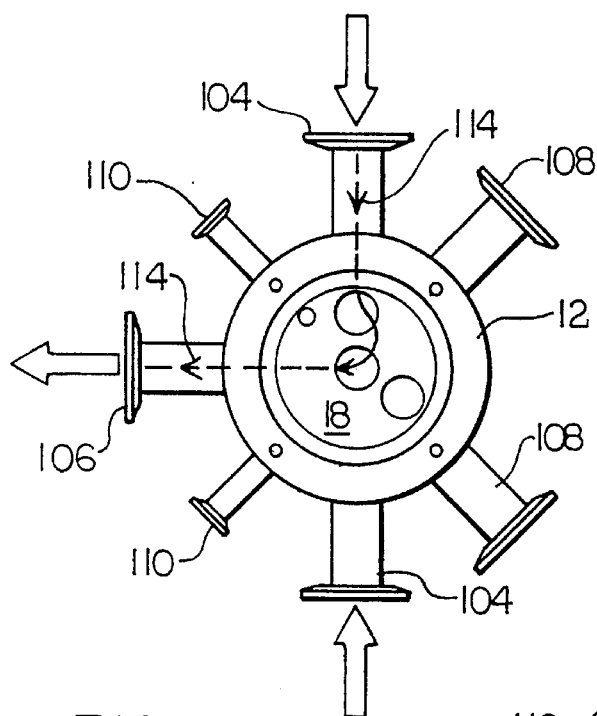
FIGS. 12A–12C are diagrammatic representations of a three-way mixing valve of the present invention having clean-in-place (CIP) and steam-in-place (SIP) capability.
Figure 12B:
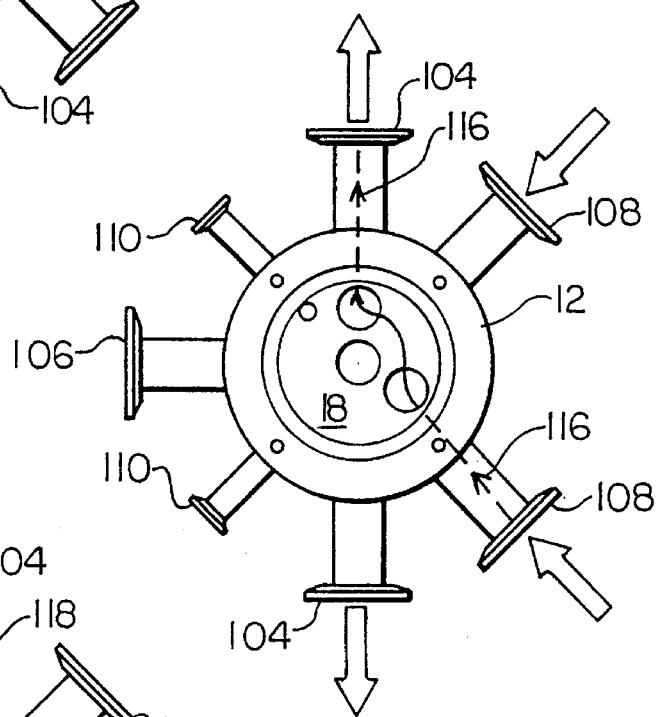
Figure 12C:
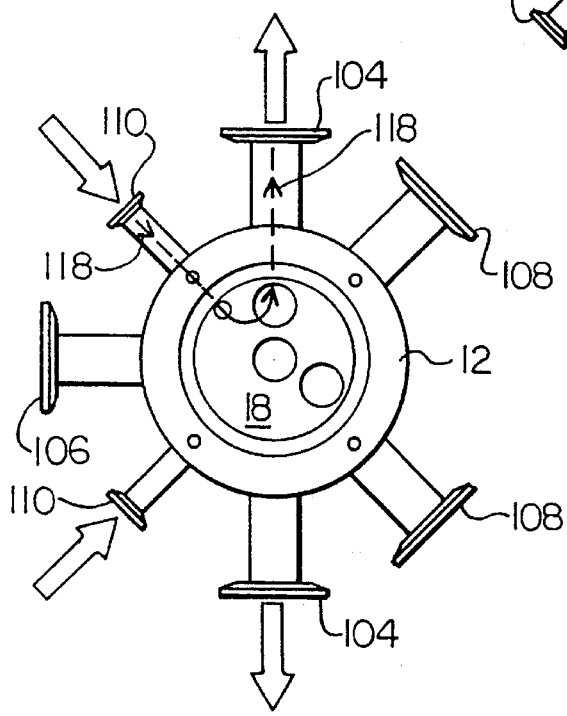

FIGS. 12A–12C show a three-way valve of the present invention configured to include clean-in-place (CIP) and steam-in-place (SIP) capability. The embodiment of those figures includes two product fluid input ports 104 and a common product fluid output port 106. The embodiment further includes two CIP input ports 108 and two SIP input ports 110. Although FIGS. 12A–12C show one face of the valve body (without the actuator or diaphragm), because the valve is a three-way valve, the opposite side of the valve (not shown) includes a similar valve body face with a second diaphragm valve and actuator.

Referring to FIG. 12A, which depicts the process flow pattern when the valve is operated as a mixing valve, product fluids enter product input ports 104 and through actuation of the pair of diaphragms (not shown) are mixed as desired and exit the valve through common output port 106. The flow of product fluid through the top portion of the valve body 12 in FIG. 2A is depicted by flow arrow 114.

FIG. 12B depicts the CIP fluid flow path when the valve is operated during a CIP cycle. CIP fluid enters CIP input ports 108 and exits the valve through product fluid input ports 104. The flow of CIP fluid through the top portion of valve body 12 in FIG. 12B is depicted by arrow 116.

FIG. 12C depicts the steam flow path when the valve is operated during a SIP cycle. Steam enters SIP input ports 110 and exits the valve through product fluid input ports 104. The flow of steam through the top portion of valve body 12 in FIG. 12C is depicted by arrow 118.

For CIP and SIP operations, the bowl 18 of the valve body 12 must be configured deep enough to accommodate a large enough fluid and/or steam flow through the bowl to sufficiently clean and/or sterilize the valve.

The features of the valve of the present invention eliminate dead space in the valve where fluid or substances can collect and cause contamination. The features also reduce the distance of fluid flow through the valve, which also significantly reduces the chance of contamination and significantly improves flow shift time. The small footprint of the valve results in significant space and cost savings.

The above description merely illustrates the presently preferred embodiments of the invention. Alternative embodiments are possible. Accordingly, the scope of the invention should be determined by the appended claims and their legal equivalents, not by the embodiments described above.

What is claimed is:

1. A fluid valve, comprising:
    a valve body defining (a) a bowl-shaped cavity having a curvilinear, concave interior surface, (b) a first fluid passage through said body in communication with said cavity at a first hole in the center of said cavity, and (c) a second fluid passage through said body in communication with said cavity at a second hole in a side of said cavity;

a diaphragm attached to said valve body and spanning said cavity, said diaphragm having first and second opposite surfaces wherein said first surface is substantially planar and said second surface confronts said cavity and includes a raised edge around the circumference of said second surface, a raised boss at the center of said second surface, and a web portion between said boss and said raised edge, wherein said boss is positioned over said first hole, has a size larger than said first hole, and has sufficient thickness to close said first hole when said diaphragm is flexed toward said hole, and wherein said diaphragm includes a transition area on said second surface which gradually transitions the thickness of said diaphragm from the thickness at said boss to the thickness at said web portion; and an actuator connected to said first surface of said diaphragm for flexing said diaphragm to open and close said first hole.

2. The valve of claim 1, wherein said interior surface of said cavity is smoothly curved.

3. The valve of claim 2, wherein said first hole and said boss are circular.

4. The valve of claim 2, wherein said cavity has an uninterrupted, smooth interior surface.

5. The valve of claim 1, wherein said first hole and said boss are circular.

6. The valve of claim 1, wherein said boss further comprises a base portion and a metering portion.

7. The valve of claim 6, wherein said metering portion comprises a tapered portion which extends into said first hole to meter fluid flow through said first hole when said first hole is open.

8. The valve of claim 7, wherein said tapered portion has a conical shape.

9. The valve of claim 1, wherein said diaphragm is held in radial compression by said valve body.

10. The valve of claim 1, wherein said transition area or said diaphragm includes a first radius portion which gradually transitions the thickness of said diaphragm from the thickness at said boss to the thickness at said web portion.

11. The valve of claim 10, wherein said diaphragm further includes a second radius portion which gradually transitions the thickness of said diaphragm from the thickness at said raised edge to the thickness at said web portion.

12. The valve of claim 11, wherein the thickness of said diaphragm at said raised edge is at least about 2 times the thickness of said diaphragm at said web portion.

13. The valve of claim 11, wherein the radius of said second radius portion is smooth.

14. The valve of claim 11, wherein said second radius portion has a radius of about 0.32 to about 0.60 inches.

15. The valve of claim 10, wherein the radius of said first radius portion is smooth.

16. The valve of claim 10, wherein said first radius portion has a radius of about one-half of the diameter of said boss.

17. The valve of claim 1, wherein said valve body defines a plurality of each of said cavity, said first and second passages and said first and second holes, each cavity having at least one of said diaphragm and at least one of said boss, and wherein a common fluid passage connects a plurality of said first passages.

18. The valve of claim 1, wherein said boss of said diaphragm has a diameter between about 1.25 to about 1.35 times greater than the diameter of said first hole.

19. The valve of claim 1, wherein said cavity has a diameter of at least about 3.5 times the diameter of said boss, and wherein said cavity has a depth of at least about one-eighth of said diameter of said cavity.

20. The valve of claim 19, wherein said cavity has a diameter of about 3.5 to about 4 times the diameter of said boss.

21. The valve of claim 1, wherein said diaphragm is made of machined, virgin polytetrafluoroethylene.

22. The valve of claim 1, wherein said actuator is selected from the group consisting of pneumatic, manual, electromechanical and hydraulic actuators.

23. The valve of claim 1, wherein said valve body further defines a third fluid passage through said body in communication with said cavity at a third hole.

24. A fluid valve, comprising:

a valve body defining (a) a bowl-shaped cavity having a smooth, curvilinear, concave interior surface, (b) a first fluid passage through said body in communication with said cavity at a first hole in the center of said cavity, and (c) a second fluid passage through said body in communication with said cavity at a second hole in a side of said cavity;

a diaphragm attached to said valve body and spanning said cavity, said diaphragm having first and second opposite surfaces wherein said first surface is substantially planar and said second surface confronts said cavity and includes a raised edge around the circumference of said second surface, a raised boss at the center of said second surface, and a web portion between said boss and said raised edge, where in said boss is positioned over said first hole, has a size larger than said first holes, and has sufficient thickness to close said first hole when said diaphragm is flexed toward said hole, and wherein said diaphragm includes a first radius portion on said second surface which gradually transitions the thickness of said diaphragm from the thickness at said boss to the thickness at said web portion; and an actuator connected to said first surface of said diaphragm for flexing said diaphragm to open and close said first hole.

25. The valve of claim 24, wherein said cavity has a diameter of at least about 3.5 times the diameter of said boss, and wherein said cavity has a depth of at least about one-eighth of said diameter of said cavity.

26. The valve of claim 25, wherein said cavity has a diameter of about 3.5 to about 4 times the diameter of said boss.

27. The valve of claim 24, wherein said boss of said diaphragm has a diameter between about 1.25 to about 1.35 times greater than the diameter of said first hole.

28. The valve of claim 24, wherein said first radius portion has a smooth radius of about one-half of the diameter of said boss.

29. The valve of claim 24, wherein said diaphragm further includes a second radius portion which gradually transitions the thickness of said diaphragm from the thickness at said raised edge to the thickness at said web portion.

30. The valve of claim 29, wherein the thickness of said diaphragm at said raised edge is at least about 2 times the thickness of said diaphragm at said web portion.

31. The valve of claim 29, wherein said second radius portion has a smooth radius of about 0.32 to about 0.60 inches.

32. The valve of claim 24, wherein said diaphragm is made of machined, virgin polytetrafluoroethylene.

33. The valve of claim 24, wherein said actuator is selected from the group consisting of pneumatic, manual, electromechanical and hydraulic actuators.

34. The valve of claim 24, wherein said valve body further defines a third fluid passage through said body in communication with said cavity at a third hole in a side of said cavity.

* * * * *